(12) United States Patent
Ngari et al.

(10) Patent No.: US 7,712,046 B2
(45) Date of Patent: May 4, 2010

(54) VIRTUAL MAGNIFYING GLASS WITH INTUITIVE USE ENHANCEMENTS

(75) Inventors: Joseph K. Ngari, Seattle, WA (US); Kevin J. Smith, Redmond, WA (US); Scott Mitchell Mail, Seattle, WA (US); Jacob Fleisher, Redmond, WA (US); Michael Winser, Westport, CT (US); David V. Esposito, North Haven, CT (US)

(73) Assignee: Microsoft Corporation, Redmond, WA (US)

( * ) Notice: Subject to any disclaimer, the term of this patent is extended or adjusted under 35 U.S.C. 154(b) by 150 days.

(21) Appl. No.: 11/356,142

(22) Filed: Feb. 17, 2006

(65) Prior Publication Data

US 2007/0030245 A1    Feb. 8, 2007

Related U.S. Application Data

(62) Division of application No. 11/196,515, filed on Aug. 4, 2005.

(51) Int. Cl.
*G06F 3/00* (2006.01)
*G06F 3/048* (2006.01)
*G09G 5/26* (2006.01)

(52) U.S. Cl. .................. 715/801; 715/800; 345/629

(58) Field of Classification Search ............... 715/801, 715/800; 345/625
See application file for complete search history.

(56) References Cited

U.S. PATENT DOCUMENTS

| | | | |
|---|---|---|---|
| 5,298,890 A * | 3/1994 | Kanamaru et al. | ......... 345/157 |
| 5,375,199 A | 12/1994 | Harrow | |
| 5,598,183 A | 1/1997 | Robertson | |
| 5,651,107 A | 7/1997 | Frank | |
| 5,696,530 A | 12/1997 | Maejima | |
| 5,754,348 A | 5/1998 | Soohoo | |

(Continued)

OTHER PUBLICATIONS

Zhang et al., Image Magnification Based on Adaptive MRF Model Parameter Estimation, Dec. 13, 2005, IEEE CNF, 653-656.*

(Continued)

*Primary Examiner*—William L Bashore
*Assistant Examiner*—Jordany Núñez
(74) *Attorney, Agent, or Firm*—Merchant & Gould P.C.

(57) ABSTRACT

A display screen magnifier is controllable by a user to magnify selected portions of a desktop including windows open on the screen. A moveable magnifier frame is provided, within which a magnified image is presented. The magnified image corresponds to screen content located within a magnification region underlying the magnifier frame, magnified to a set level of magnification. In one embodiment, the magnification region is moveable relative to the magnifier frame, in relation to movement of the magnifier frame on the display screen. Such relative movement can be used to avoid a potentially disorienting edge condition that arises when a magnifier frame reaches an edge of the display screen and stops, while its associated magnification region continues to pan. In another embodiment, the cursor of a user input device is moveable across the screen display into and out of the magnification region. When the position of the cursor falls within the magnification region, the cursor appears within the magnified image presented within the magnifier frame. A related feature avoids the potentially disconcerting effect of cursor disappearance as a pointing device cursor passes into a "lens shadow" defined between the magnification region and the magnifier frame.

6 Claims, 8 Drawing Sheets

U.S. PATENT DOCUMENTS

| | | | | |
|---|---|---|---|---|
| 5,808,601 | A | * | 9/1998 | Leah et al. .................. 715/856 |
| 5,808,604 | A | * | 9/1998 | Robin ........................ 715/862 |
| 5,815,138 | A | * | 9/1998 | Tsubaki et al. .............. 715/857 |
| 6,128,006 | A | | 10/2000 | Rosenberg |
| 6,184,859 | B1 | * | 2/2001 | Kojima ....................... 345/629 |
| 6,590,583 | B2 | | 7/2003 | Soohoo |
| 6,704,034 | B1 | | 3/2004 | Rodriguez |
| 7,009,600 | B2 | | 3/2006 | Jones |
| 7,275,219 | B2 | | 9/2007 | Shoemaker |
| 2002/0011990 | A1 | | 1/2002 | Anwar |
| 2003/0076363 | A1 | * | 4/2003 | Murphy ....................... 345/800 |
| 2003/0210262 | A1 | | 11/2003 | Gahm |
| 2007/0033542 | A1 | | 2/2007 | Winser et al. |
| 2007/0033543 | A1 | | 2/2007 | Ngari et al. |
| 2007/0033544 | A1 | | 2/2007 | Fleisher et al. |

OTHER PUBLICATIONS

Executable software/documentation: ABF Magnifying Tools.
Executable software/documentation: Bigshot.
Executable software/documentation: Dragnifier.
Executable software/documentation: ExactMouse2.0.
Executable software/documentation: LunarPlusDemo.
Executable software/documentation: Magnifixer.
Executable software/documentation: ZoomMagic.
Executable software/documentation: ZoomText.
MSDN website article: "About Hooks," 2005.
MSDN website article: "About Mouse Input," 2005.
MSDN website article: "CreateWindowEx Function," 2005.
MSDN website article: "Driver Chain Manager," 2005.
MSDN website article: "Window Features," 2005.
MSDN website article: "Win32 Hooks," 1994.
Specification (including claims) and drawings of U.S. Appl. No. 11/196,511, filed Aug. 4, 2005; inventors: Jacob Fleisher et al.
Specification (including claims) and drawings of U.S. Appl. No. 11/196,510, filed Aug. 4, 2005; inventors: Michael Winser et al.
Preliminary Amendment filed in parent U.S. Appl. No. 11/196,515.
International Search Report for Application No. PCT/US06/30151 dated Nov. 08, 2007, 8 pages.
U.S. Office Action mailed Feb. 6, 2008 in U.S. Appl. No. 11/196,510.
U.S. Office Action mailed May 12, 2008 in U.S. Appl. No. 11/196,511.
U.S. Office Action mailed Jan. 23, 2008 in U.S. Appl. No. 11/196,515.
U.S. Final Office Action mailed Sep. 29, 2008 in U.S. Appl. No. 11/196,515.
U.S. Office Action mailed Nov. 12, 2008 in U.S. Appl. No. 11/196,510.
U.S. Office Action mailed Dec. 31, 2008 in U.S. Appl. No. 11/196,511.
US Final Office Action mailed Dec. 7, 2009 in U.S. Appl. No. 11/196,515.
US Non-Final Office Action mailed Jun. 9, 2009 in U.S. Appl. No. 11/196,515.
US Non-Final Office Action mailed Aug. 12, 2009 in U.S. Appl. No. 11/196,511.

* cited by examiner

VIRTUAL MAGNIFYING GLASS WITH INTUITIVE USE ENHANCEMENTS

This application is a divisional of application Ser. No. 11/196,515, filed Aug. 4, 2005.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Various types of computer display screen magnification and zoom functionalities are known. In general, such magnifiers show a magnified copy of a portion of what appears on a computer's screen. Such functionalities have been provided as accessibility options for the visually impaired, and for other purposes, both as features provided within particular application software, and as specialty software intended to provide magnification/zoom functionalities generally available for use at an operating system (e.g., desktop) level and with user applications. For the visually impaired, such features may assist with the reading of small screen text and/or the discernment of icons and the like. More generally, magnifications and zoom functionalities can be useful within applications, and at an operating system (e.g., desktop) level, where it may be desired to enlarge all or a portion of screen objects or images.

An example of a user application providing zoom functionalities is Adobe Acrobat's .pdf document reader. In addition to standard toolbar zoom level selections via a dropdown menu, there are three pan and zoom related features: Loupe Tool, Pan & Zoom window, Dynamic Zoom tool.

With the Loupe Tool, a user controls the zoom level with a slider and controls the zoom position by clicking within a document. The zoomed area is represented by a rectangle on the document which is inversely proportional in size to the zoom level; the zoomed view is shown in a separate window. With the Pan & Zoom window feature, a resizable box is moveable on a document page presented in a small window. A document view provided in the background zooms and pans as the box is resized and moved. With the Dynamic Zoom tool, the regular cursor changes to a representation of a small magnifying glass signifying that a zoom mode has been entered. In this mode, a user is able to click on the document and drag up/down to dynamically zoom in and out, and is able to pan at the lateral edges of the document.

As a further example of a zoom feature provided as part of user application software, Digital Image Pro offers a set of controls on a tool bar provided as part of a window for navigating images. These include a slider based zoom level, return to 100% button, panning window, and a zoom to selection button. Similar to the Adobe Pan and Zoom feature, a box whose size is inversely proportional to a selected zoom level is moveable on an image presented in a small window. A magnified view of the image portion within the box is provided in the background.

Figure 4:
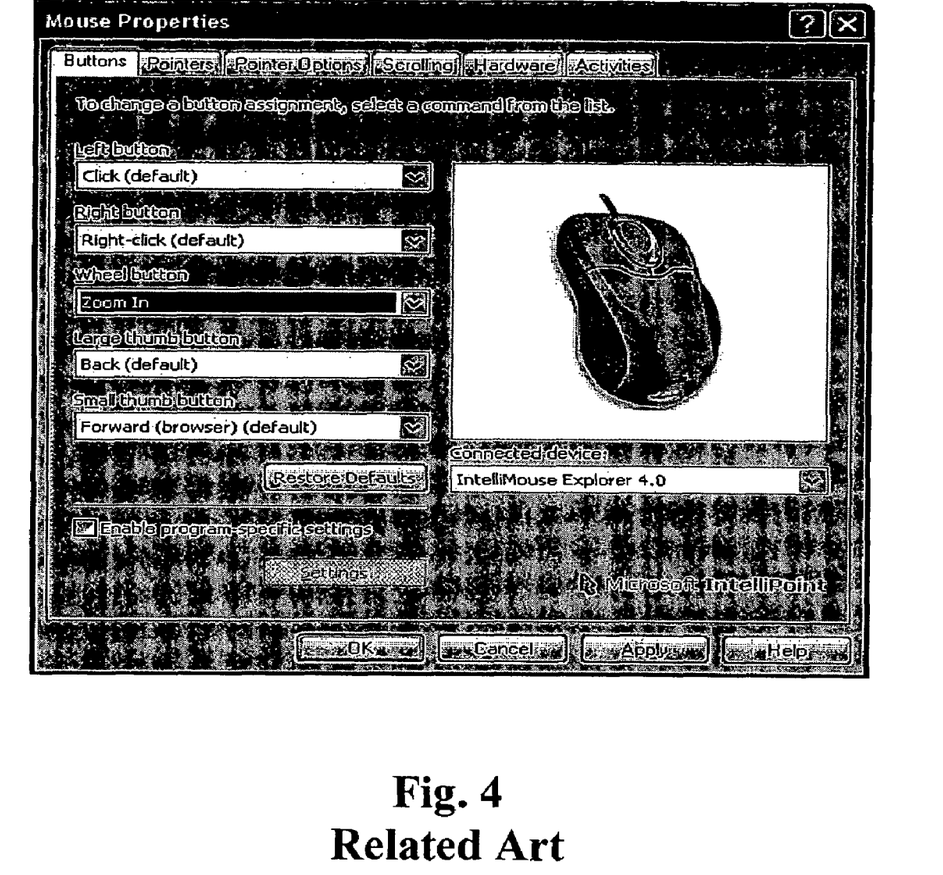
FIG. 4 shows a control panel provided as part of software for use with a Related Art computer mouse product of the present assignee.

Applications commonly implement zoom functionalities utilizing the input facilities of a computer mouse. For example, rolling the scroll wheel on a mouse in conjunction with pressing the CTRL key on the keyboard (CTRL+Wheel) may allow users to zoom in and out of applications. Each application has its own zooming increments, and scroll wheel zooming applies these increments. Other zoom options reside within the Microsoft IntelliPoint™ (mouse) software control panel, as shown in Related Art FIG. 4. On the Buttons tab, Zoom In and Zoom Out commands have recently been added as options for each mouse button. Some Microsoft keyboards have a Zoom control (e.g., "slider"), which operates under the control of Microsoft's IntelliType™ software.

As compared with magnifier software developed for use at an operating system (desktop) level, there is greater flexibility in the development of magnification and zoom features for a particular user application, as the application can be structured from "the ground up" to accommodate those features. Also, with an application specific magnifier, interaction of the magnifier with independently executing programs and their associated windows is generally not a concern. Zooming is easily achieved in an application. The application has an internal representation of the content to be displayed and if designed correctly it can display the content at different sizes or zoom levels. In Microsoft's Word,® for example, you can zoom in until only a few lines show on the screen yet the text is very clear because the fonts are based on vector graphics (mathematical descriptions of the characters instead of bitmaps).

With a magnifier designed to be generally available for use with the desktop and with any other open windows, i.e., at an operating system (OS) level, the internal representation that an application may have for zoom functionalities is not available. Rather, magnification is performed by manipulation of a screenshot or bitmap of the output. Although this doesn't typically increase the detail beyond the applicable screen resolution, it does allow users to view user interface (UI) objects and text at larger sizes. The manner in which such a magnifier interacts with the various underlying screen elements and windows is of great importance; the nature of that interaction is likely to have a significant impact on the actual and perceived usability of the feature.

An example of an existing OS level screen magnification feature is the "Magnifier" of Microsoft's Windows XP® operating system. Magnifier is a display utility that makes the screen more readable for users who have impaired vision. It creates a separate window that displays a magnified portion of the screen, which portion is determined by the position of the pointing device cursor, e.g., mouse pointer. A user can change the magnification level via settings in the feature's control panel. The user can move or resize the Magnifier window, or drag it to the edge of the screen and lock it into place.

Figure 1:
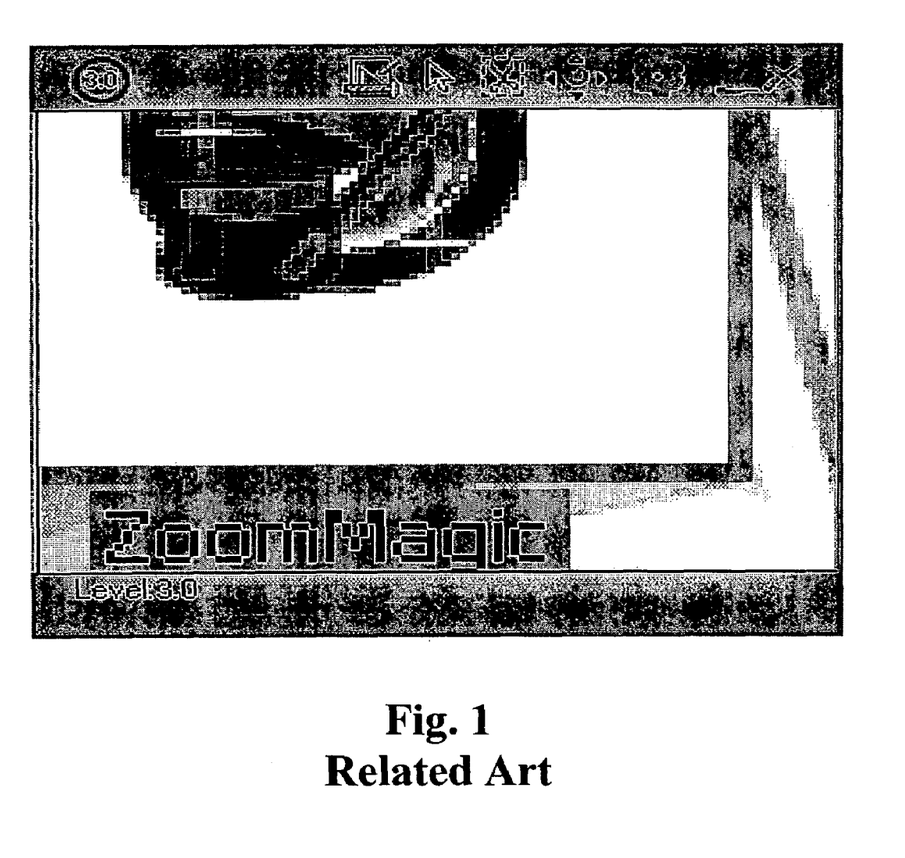
FIG. 1 is a screen shot showing an on-screen magnification window of a Related Art magnifier product.

A known screen magnification specialty application is Zoom Magic. When launched, this application opens a custom magnification window, as shown in FIG. 1. The window is sizable and moveable as a regular window. All tools/settings are available in the title bar. The window magnifies whatever is immediately beneath. The mouse cursor can move over the magnified content but it cannot interact with the content.

Referring to FIG. 1, there is a cursor tracking mode initiated by clicking the arrow button in the window title bar. Clicking on the different red arrows will dock the window top/bottom/left/right. Center undocks the window and reverts it to a regular window. This mode allows overlay of other open windows but does not allow interaction with underlying application windows within the magnification window. Cursor tracking can be toggled on/off by clicking the arrow button. There is an option to keep the magnification window on top of the desktop and any other open windows, but in this mode the magnified image does not update unless the magnification window is clicked.

Figure 2:
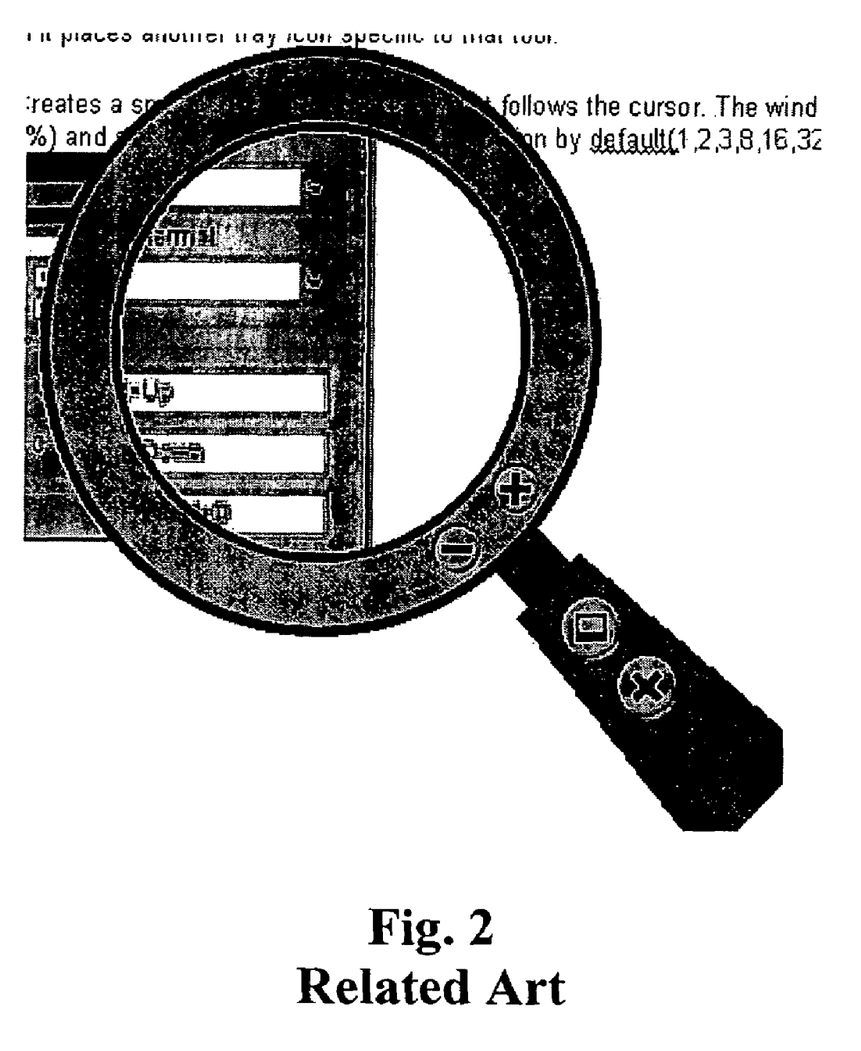
FIG. 2 is a screenshot showing another Related Art magnifier product.

"Lens" is a tool offered by ABF Magnifying Tools (http://www.abf-soft.com/magnifying-tools.shtml) which creates a caricature of a magnifying glass, as seen in Related Art FIG. 2. The user can reposition the glass by dragging and use it to selectively zoom-in on areas of the screen. A user can adjust the magnification level by clicking the + & − buttons. This tool takes a static screen shot at the time of activation. If anything changes on the screen, it is not reflected in the zoomed image.

Figure 3:
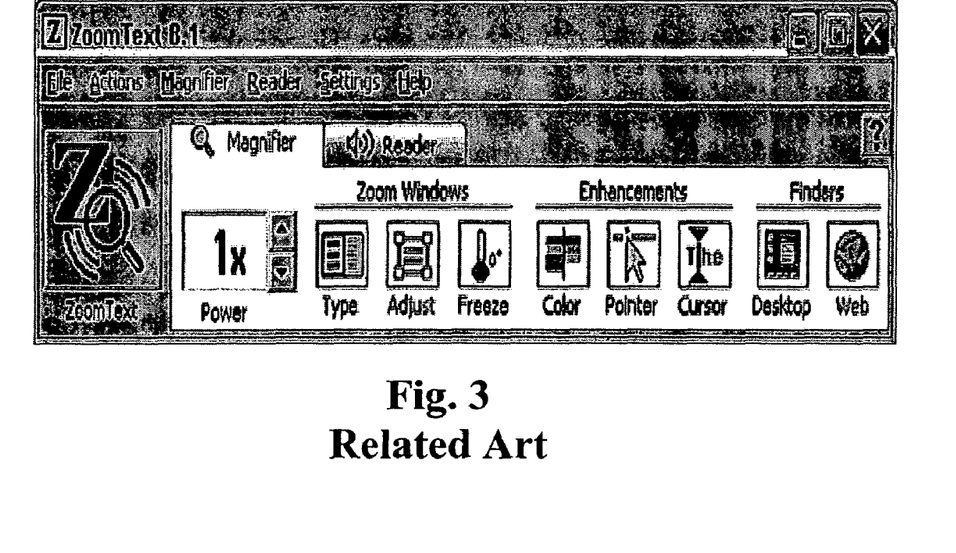
FIG. 3 is a screen shot showing an on-screen tool bar window of a Related Art magnifier product.

Another example of a known accessibility specialty application is ZoomText 8.1, by AI$^2$ (http://www.aisquared.com/index.htm). When application is launched, a modal control panel type user interface (UI) appears, as shown in Related Art FIG. 3.

The magnifier/zoom features of ZoomText 8.1 have several modes:

A Full Screen Mode magnifies the entire screen incrementally. As the mouse nears the edges of the screen, panning is initiated automatically.

An Overlay Mode creates a resizable square window in the bottom right hand corner of the screen. The mouse tracks in the regular (1:1) view and that movement is mirrored in the magnified view. As the mouse nears the edges of the screen, panning is initiated automatically within the zoom window.

A Lens Mode creates a floating resizable square window that moves with the mouse cursor. A Line Mode creates a horizontal band across the screen that moves up and down with changes in the Y coordinates of the mouse cursor. Dynamic updating occurs within the magnification window to reflect changes in the screen content during use, and interaction with underlying application windows is available through the magnification window, i.e., mouse and keyboard input are permitted to pass through the magnifier to the underlying window.

A Docked Mode creates a resizable band (outlined in black) positioned against either the top, bottom right or left edges of the screen. Mouse movement is tracked only in the zoomed view, while the 1:1 view is locked.

When enabled, a Freeze It tool allows the user to draw a resizable box on the screen and lock down ("freeze") its position. The predefined box view locks the zoom position to particular X and Y coordinates. If content changes within the area that is magnified, then it is reflected in the magnified content within the box. Freeze mode is available only in the "Full Screen" magnifier mode. In the full Screen mode, there is no lens; the whole screen is magnified and the mouse pans to "off-screen" areas.

Known display screen magnifiers are less than ideal in terms of their simplicity and convenience, and the intuitiveness of their use. Also, the manner in which some magnifiers are implemented renders them highly fragile, i.e., susceptible to malfunction in the event of operating system/driver updates and patches.

It would be desirable to have a robust computer implemented display screen magnifier which behaves more like an actual optical lens magnifier in terms of being able to "float above" the computer desktop and other open windows, to provide a magnified view of what is beneath it in a natural and intuitive way, and to permit uninhibited viewing and interaction with the underlying desktop/windows.

Implementing a magnification application intended for use with an operating system that provides a windows-based graphical user interface (GUI), e.g., a Microsoft's Windows® operating system, presents certain challenges. If the magnifier is created as a conventional window, the magnification window itself becomes a part of the desktop when it is opened. As a result, system calls to get desktop images for magnification will include the magnifier window itself (and not that portion of the GUI underneath it). Use of such system calls to do magnification, as in the Windows XP magnifier, lead to an infinity mirror effect. The result from a user perspective is that he/she is precluded from obtaining a magnified view of what lies beneath the magnification window.

A number of available magnification applications, such as the previously mentioned ZoomText product, have dealt with the above-described difficulty using a technique known as driver chaining. With this approach, a selected portion of the screen content composited by the operating system is intercepted and manipulated by the kernel level magnifier before going to the video display driver. With screen reading or screen magnification software, assistive technology vendors (ATVs) essentially locate the display driver, get the information needed for it, then pass the sometimes modified Display Driver Interface (DDI) calls to the original display driver. (Certain remote control software also uses this technique to intercept information being passed to a remote computer.) The DDI interception technique is called driver chaining. The chained driver intercepts the DDI calls from GDI to the display driver and manipulates the calls in such a way as to magnify a part of the screen. As far as the Windows® operating system is concerned, the superimposed magnifier output is simply not there, so calls to copy portions of the desktop will not see it.

Because driver chaining intervenes with a preestablished operating system/driver relationship, it may not be officially supported by the operating system supplier, e.g., Microsoft. As a result, the technique tends to be very fragile and prone to malfunction, e.g., if the operating system is upgraded with new service packs or drivers. Additional information concerning driver chaining, and its application in screen magnifiers and other assistive technology products, can be found on the Microsoft Developers Network (MSDN), at http://msdn.microsoft.com/library/default.asp?url=/library/en-us/dnacc/html/atg_driverchain.asp.

The inventors have recognized additional shortcomings in existing screen magnification tools such as the ones described above. In particular, in those types that serve to provide a moveable magnification window that magnifies what is beneath it, a potentially disorienting incongruity arises when the magnification window is moved over to a screen edge.

Take, for example, the case of the ZoomText 8.1 Lens Mode tool that magnifies a small portion of the screen centered on the mouse pointer. As the mouse pointer is moved, the lens defined by a magnifier frame, and its associated magnification region (the underlying smaller region captured for magnification), move together in lock-step. This behavior is consistent until the magnifier frame hits a screen edge, at which point the magnifier frame stops. The magnification region then becomes decoupled from the magnification frame so that it may continue to pan. For example, if the magnifier frame is moved to the upper right, it will stop when it hits the right side screen edge; at this point, the magnification region will be able to pan independently of the frame until it also hits a screen edge, as it follows the pointing device (e.g., mouse) cursor movement. By continuing to follow the pointing device cursor, the magnification region can be moved away from the screen edge back toward the center of the magnifier frame. When the magnification region once again becomes centered in the magnifier frame, the frame and region will be recoupled to move together again.

Figure 6:
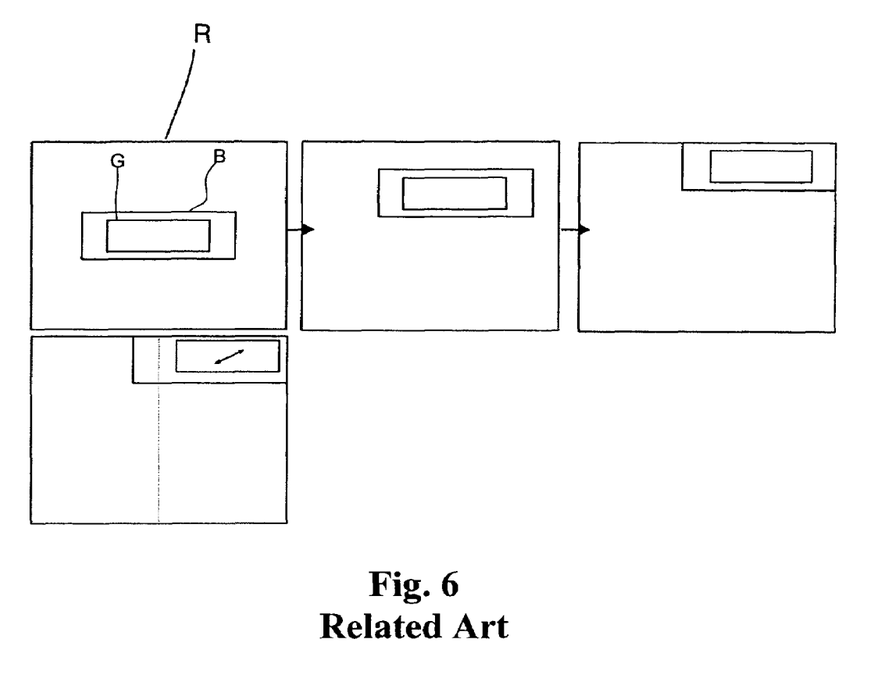
FIG. 6 is a diagrammatic view depicting sequential on-screen movement of a magnification frame and underlying magnification region of a Related Art magnifier.

Related Art FIG. 6 shows a sequential visualization of the above-described movement of a magnifier frame and magnification region. Therein, Rectangle R represents a display screen (e.g., size 800×600 resolution). Rectangle B represents a magnifier frame (lens) (e.g., size 60% screen resolution width×25% screen resolution height). Rectangle C represents a magnification region (determined by 150% magnification level and lens size) underlying the magnification lens.

Since the magnifier frame ordinarily moves in lock-step with the pointing device cursor, and the cursor cannot leave the magnify lens, the edge condition of the magnification region becoming decoupled from the magnifier frame, and the frame no longer moving with the pointing device cursor as it continues to pan, can be very disorienting to a user. It also requires more pointing device movement to achieve some tasks than is desirable.

Other known screen magnifiers permit the magnification window to be moved independently of the mouse cursor. A shortcoming of this known type of magnifier is that the cursor is unable to move continuously into and out of the magnified image presented within the magnification window.

SUMMARY OF THE INVENTION

The present invention provides software/firmware based systems and methods, executable on a data processing device (e.g., a general or special purpose computer) provided with display screen and user input device (e.g., a pointing device such as a computer mouse, trackball or touch pad, or a computer keyboard). These systems and methods serve to provide a means by which a user may conveniently, selectively enlarge portions of the content of the screen display. New approaches to providing such a display screen magnifier are provided in order to address one or more shortcomings of known magnifiers as described above.

A magnifier in accordance with the invention is controllable by a user to magnify selected portions of a desktop and windows open on the screen. A moveable magnifier frame is provided, within which a magnified image is presented. The magnified image corresponds to screen content located within a magnification region underlying the magnifier frame, magnified to a set level of magnification.

In one aspect of the invention, the magnification region of the magnifier is moveable relative to the magnifier frame, in relation to movement of the magnifier frame on the display screen. Such relative movement is usable to address the previously described disorienting edge condition that arises when the magnifier frame of known magnifiers reaches an edge of the display screen.

In another aspect of the invention, the cursor of a user input device is moveable across the screen display into and out of the magnification region. When the position of the cursor falls within the magnification region, the cursor appears within the magnified image presented within the magnifier frame. A related aspect of the invention avoids the potentially disconcerting effect of cursor disappearance as a pointing device cursor passes into a "lens shadow" defined between the magnification region and the magnifier frame.

In accordance with an aspect of the invention, the display screen magnifier is configured to operate by leveraging resources made available by application programming interfaces (APIs) of an operating system, namely a windows style, and a second stage screen content compositing engine associated with the windows style.

In accordance with an aspect of the invention, a magnifier window is created which is effectively invisible to the calls to get a desktop image to be magnified. This enables the magnifier to operate in an intuitive manner, permitting the viewer to view what is directly beneath the magnifier, and to interact with the magnifier, without taking focus away from open application windows and/or the desktop. An embodiment of the invention makes advantageous use of windows styles made available by the APIs of Microsoft Windows® 2000 and XP operating systems. In this manner, the need for use of fragile driver chaining techniques is avoided.

The above and other objects, features and advantages of the present invention will be readily apparent and fully understood from the following detailed description of preferred embodiments, taken in connection with the appended drawings.

DETAILED DESCRIPTION OF THE PREFERRED EMBODIMENTS

An on-screen magnifier according to the invention includes a moveable magnifier frame within which a magnified image is presented. The magnified image corresponds to screen content located within a magnification region underlying the magnifier frame, magnified to a set level of magnification.

A display screen magnifier in accordance with an embodiment of the invention is configured such that while it is activated, it remains on top of the desktop and any other open windows of a screen display. It passes events of a user input device (e.g., a mouse or keyboard) to windows located beneath the magnifier, and dynamically updates the magnified image to reflect changes in underlying screen content. Such a display screen magnifier may be embodied in software or firmware executed on a general purpose computer or other data processing device provided with a display screen and user input device.

An aspect of the invention involves achieving the above-described behavior by leveraging resources made available through existing application programming interfaces (APIs) of an operating system, particularly a windows style, and a second stage screen content compositing engine associated with that windows style. As used herein, "windows style" broadly encompasses any set of parameters specifying the functional and/or visual characteristics of a window which is to appear as part of a graphical user interface (GUI), including sets of parameters included within one or plural designated windows styles specified within a set of APIs. The inventive approach can be used in lieu of fragile driver chaining techniques.

In an exemplary embodiment of the invention, the magnifier comprises a magnify window created with the following extended window styles, which are provided as part of the APIs of Microsoft's Windows® 2000 and XP operating systems for personal computers:

WS_EX_TRANSPARENT: This windows style specifies that the window will not be painted until windows beneath this window are painted. This allows a "snapshot" of the screen below the magnifier to be taken before the magnifier is drawn.

WS_EX_LAYERED: When this style is used in combination with the WS_EX_TRANSPARENT style, the magnifier window will not receive user input from the mouse or keyboard; all input is passed to the applications below the magnifier. When the magnifier window is created as a layered transparent window, pointing device (e.g., mouse) events will be passed to other windows underneath the layered window. Also, this windows style optimizes per-pixel alpha blending which can be used to give the magnifier an alpha blended frame. This characteristic can be used to give the user a visual clue that the magnifier is "floating" above the desktop.

WS_EX_NOACTIVATE: This windows style also makes the window so that it doesn't take "focus." That is, if the magnifier window is provided as a window that ordinarily becomes visually highlighted (e.g., a regular window provided with a title bar), the window will not become visually highlighted (e.g., lit-up) as an active window upon clicking within it with a pointing device (e.g., mouse). The user can click through the magnifier. Also, keyboard events (input) will not be captured by the magnifier. This permits the user to interact freely with an application window positioned below the magnifier. Also, with this style, the magnifier does not appear on the taskbar.

WS_EX_TOOLWINDOW: Addition of the style makes it so the magnifier also does not show up in the alt-tab listing of open windows/applications.

WS_EX_TOPMOST: This Windows style maintains the magnifier as the topmost window. Without it, the utility of the magnifier could be diminished by the magnifier disappearing behind other windows.

Additional information on these and other extended windows styles included in the APIs of Microsoft's Windows® operating systems can be found on the Microsoft Developers Network (MSDN), e.g., at http://msdn.microsoft.com/library/default.asp?url=/library/en-us/winui/winui/windowsuserinterface/windowing/windows/windowreference/windowfunctions/createwindowex.asp.

An exemplary magnifier window creation function that may be used is set forth below:

```
// Create Magnifier window
    HWND hwnd=::CreateWindowEx(
        WS_EX_NOACTIVATE | WS_EX_TRANSPARENT |
        WS_EX_LAYERED | WS_EX_TOPMOST |
        WS_EX_TOOLWINDOW,
            wndClass.lpszClassName, L"",
            WS_POPUP | WS_VISIBLE | WS_DISABLED,
            0,0,0,0,
            NULL, NULL, hInstance, 0) ;
```

Figure 5:
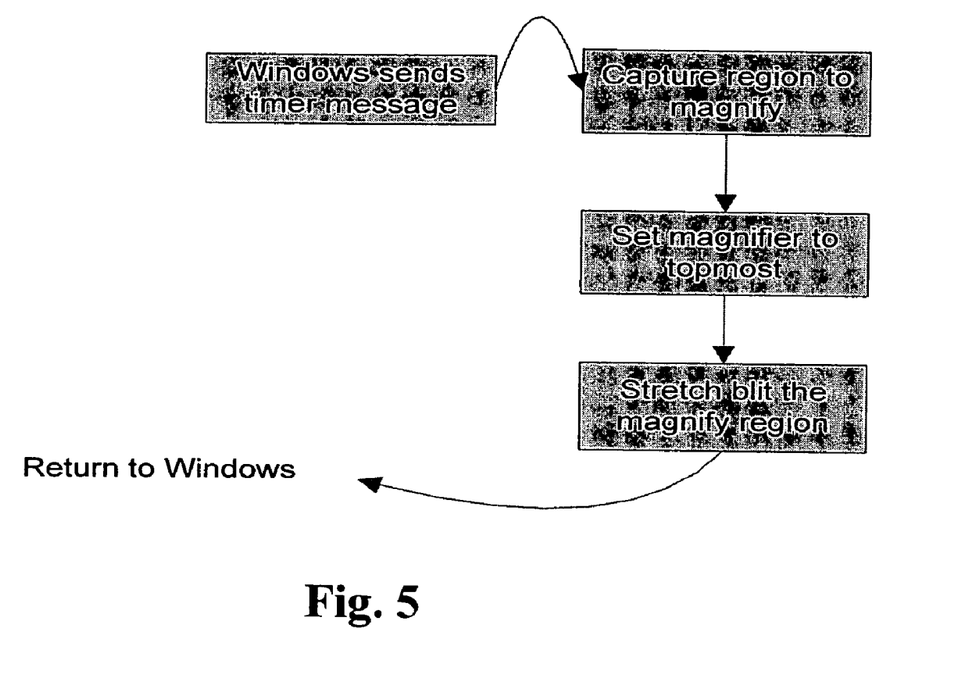
FIG. 5 is a flow-diagram illustrating a sequence of operational process steps performed by a screen magnifier embodiment of the invention.

An operational process of a magnifier in accordance with an aspect of the invention is illustrated in FIG. 5. Once the magnifier window is activated, a timer is set so that the magnifier receives a timer message at a predetermined rate (e.g., about 15 to 24 times a second). In one embodiment, the timer interval is set at 15 milliseconds, or 67 times per second. The magnifier uses the timer message to continuously update the magnifier image to reflect changes in underlying screen content occurring while the magnifier is in use (activated). An update frequency in the indicated range should permit the magnified image to change relatively smoothly as the magnification frame is moved on the screen, or if there is an animation playing in a window below it, thereby emulating the appearance of an actual optical magnifying glass held and moved in front of the screen. As shown in FIG. 5, when a timer message is received, the region to be magnified is captured, the magnifier window is set to topmost and then the capture region is drawn (e.g., "stretch blit") into the magnifier at the proper magnification level.

An embodiment of the invention makes advantageous use of the fact that USER32 (the Win32 window manager) implements a relatively simple composition engine for carrying out a second stage of composition of screen content when Transparent windows are created. This is a "second stage" of composition in the sense that it is different from, and in addition to, the ordinary or normal desktop composition process. The normal composition process employed by Microsoft's Windows® operating systems follows what is sometimes referred to as a modified painters algorithm. Windows are painted to the desktop in reverse z order (top to bottom). Aggressive "clipping" is used to confine the areas of the screen to be redrawn to areas where content is being added or change has occurred, to thereby avoid screen flicker and reduce the amount of actual painting/drawing work.

When a window uses drop shadows, transparency or any other effect that requires Windows® to merge the window's pixels with whatever is "behind" it, Windows® creates intermediate bitmap buffers for the desktop and the transparent windows, respectively. The contents of these buffers are then "composed" to create the final output. Calls to take a snapshot of the desktop (e.g., GetDC(NULL)), and to stretch blit (StretchBlt) from the desktop, will use the desktop buffer, not the desktop resulting from the second stage composition process. By making itself a Windows® "Transparent" window (even if its opacity is set to 100%), the magnification window both enables the second stage composition process, and puts itself above the main desktop. Use of the "Topmost" windows style will keep the magnifier topmost, by preventing a new window from subsequently appearing and setting itself as topmost.

As has been described, the magnifier can be implemented as a single layered (WS_EX_LAYERED), transparent (WS_EX_TRANSPARENT) window which periodically captures a portion of the screen image, stretches it, and updates its window image. With this combination of window attributes, the magnify window is not drawn until after all regular windows are drawn. This allows the magnifier to take a screen shot of the bits in the magnify region and "stretch blit" them into the magnifier frame. As previously described, this approach represents a substantial improvement over the known technique of driver chaining, which is extremely fragile in the event of any operating system (OS) component/driver upgrades or patches.

In one aspect, the present invention provides a magnifier implementing a methodology for moving the magnification region of the magnifier relative to the magnifier frame, in order to reduce or avoid a disorienting user experience when the edge of the magnifier meets the edge of the display screen. The magnification region is that portion of the screen underlying the magnification frame (lens) that is captured and magnified to fill the magnification frame. In another aspect, the magnifier is configured such that the magnifier frame is decoupled from the pointing device cursor and the cursor can move in and out of the magnifier frame in a continuous and intuitive manner.

An aspect of the invention pertains to how the magnification region moves in relation to the magnify lens. This aspect of the invention is equally applicable to the case where the magnifier is pinned to the pointing device cursor, and the case of a magnifier that allows independent pointing device cursor movement.

In accordance with an exemplary embodiment of the invention, when the magnifier frame is positioned at the center of the display screen, the magnification region is correspondingly set at the center of the screen, centered within the magnifier frame. As the magnifier frame (lens) is moved away from the center of the screen display, the magnification region moves too, but at a different rate. The result is that the magnification region moves not only with respect to the screen display, but also in relation to the magnifier frame.

In an exemplary embodiment, the movement of the magnification region relative to the magnifier frame is proportional to the movement of the magnifier frame on the screen. For example, if the magnifier frame is moved from its initial centered position in the X or Y direction 75% of the original distance between a lateral edge of the frame and a corresponding edge of the display screen, the magnification region will have correspondingly moved relative to, and within, the magnifier frame 75% of the original distance between a lateral edge of the magnification region and the corresponding outer lateral edge of the magnifier frame. As a result of such relative proportional movement, when the magnifier frame reaches a screen edge (movement equal to 100% of the original distance between the magnifier frame and the outer edge of the screen display) the magnification region will have correspondingly moved to a position placing its edge coincident with the edge of the magnifier frame, thus enabling content at the outer edge of the screen display to fall within the magnification region and thus be magnified and displayed in the magnifier frame.

Figure 7:
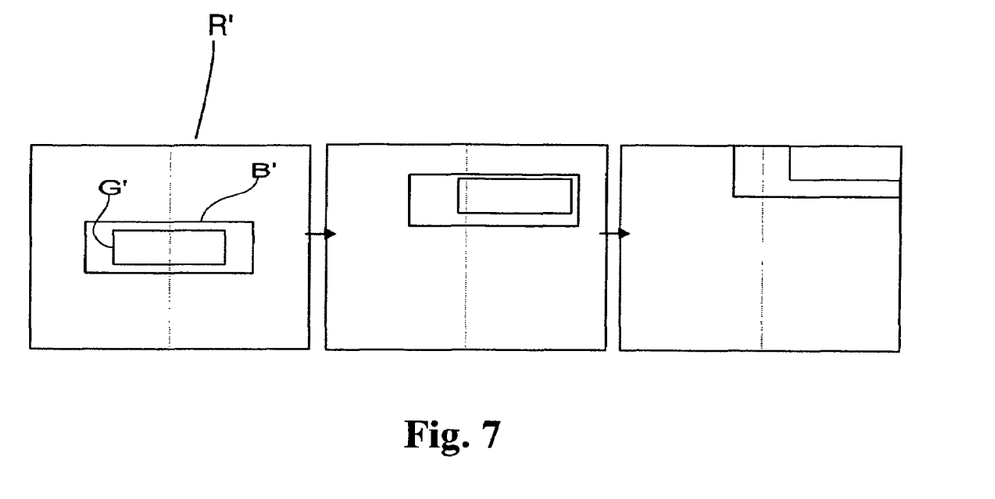
FIG. 7 is a diagrammatic view depicting sequential on-screen movement of a magnifier frame and underlying magnification region in accordance with an aspect of the invention.

FIG. 7 provides a visualization of how, in accordance with the above-described embodiment, the magnification region moves in relation to the magnifier frame. There is in this embodiment one unique position of the magnification region for each position of the magnifier frame.

In FIG. 7, Rectangle R' represents the display screen (size 800×600 resolution). Rectangle B' represents the magnifier frame (lens) (size 60% screen resolution width×25% screen resolution height). Rectangle G' represents the magnification region (determined by 150% magnification level and lens size).

This movement model reduces the disorienting effect when the user moves the magnifier to a corner or edge of the screen. Once an edge of the magnifier hits an edge of the screen, the magnification region has also moved to the point that screen content (up to and including the edge of the screen) is visible in the magnifier frame. The user does not have to move the mouse an additional distance after the magnifier frame has stopped in order to reach the edges of the screen.

What follows is a C# source code segment from a demonstration program illustrating an exemplary algorithm for implementing the inventive magnifier behavioral characteristics illustrated in FIG. 7.

```
private void RenderMagnifyMethod2( PaintEventArgs e )
{
    // positions the magnify lens based on mouse pointer
    // position the size is 70% of the width of the
    // "screen" and 20% of the height the screen is
    // represented by the client area of this app and is
    // 800x600 pixels
    int width = (int)(this.ClientSize.Width * .7);
    int height = (int)(this.ClientSize.Height * .2);
    int x = mousex - width / 2;
    int y = mousey - height / 2;
    if( x < 0 )
        x = 0;
    if( y < 0 )
        y = 0;
    if( x + width > this.ClientSize.Width )
        x = this.ClientSize.Width - width - 1;
    if( y + height > this.ClientSize.Height )
        y = this.ClientSize.Height - height - 1;
    // draw the lens
    e.Graphics.DrawRectangle( new System.Drawing.Pen(Color.Red, 3),
        x, y, width, height );
    // calculates the magnify region position based on the magnify
    // lens position and 2x magnification
    float percentxpos = (float)x / (this.ClientSize.Width - width);
    float percentypos = (float)y / (this.ClientSize.Height - height);
    width = (int)(this.ClientSize.Width * .35);
    height = (int)(this.ClientSize.Height * .1);
    x = (int)(percentxpos * (this.ClientSize Width - width));
    y = (int)(percentypos * (this.ClientSize.Height - height));
    if( x < 0 )
        x = 0;
    if( y < 0 )
        y = 0;
    if( x + width > this.ClientSize.Width )
        x = this.ClientSize.Width - width - 1;
    if( y + height > this.ClientSize.Height )
        y = this.ClientSize.Height - height - 1;
    // draw the magnify region
    e.Graphics.DrawRectangle( new System.Drawing.Pen(Color.Yellow,
    3),
        x, y, width, height );
}
```

In an exemplary embodiment, the inventive magnifier is moved like a normal window. A user can click and drag the frame of the magnifier in order to move it. The pointing device cursor can be moved independently of the magnifier window. Two different approaches can be used to permit the magnifier to be moved like an ordinary window, without causing focus to be taken away from other open windows upon clicking within the magnification lens area.

As a first approach, a high level mouse hook may be set and a watch can be made for when the mouse cursor is over the frame. If the mouse cursor is over the frame and the user clicks the mouse (indicating a desire to control the frame or "give it focus") the WS_EX_TRANSPARENT flag would be turned off in order for the magnifier to accept mouse and keyboard input. When the cursor moves off the frame or the user was done interacting with the frame, the WS_EX_TRANSPARENT style would be turned back on.

As a second approach, the magnifier may be provided as a composite of two separate windows, one nested within the other. A first window is created and a rectangular section is removed from the center of the window by calling the API SetWindowRgn to provide the frame, and a correspondingly shaped rectangular window fitting within the void of the frame window is provided for the magnifier lens region. The two windows are set to move together, and the windows styles used are set such as to permit the frame window to take focus, but not the window within the frame used to establish the magnifier lens area.

The user can move the cursor into and outside of the magnifier while the magnifier remains stationary. In accordance with an aspect of the invention, the pointing device cursor, e.g., mouse pointer, is permitted to move uninterruptedly across the boundary of the magnifier and the rest of the desktop. This can be accomplished in the following manner.

When the pointing device cursor is positioned within the magnification region, i.e., that portion of the screen underlying the magnifier frame which is to be magnified and displayed in the frame, a new cursor (which optionally could be magnified to the set level of magnification) is drawn over the corresponding magnified image (content) appearing within the magnifier frame, while the true system cursor is not drawn. With the pointing device cursor located within the magnification region, the cursor coordinates are checked and used to map or transpose the substitute cursor to the corresponding position within the magnified content appearing within the magnifier frame. This can be accomplished through use of a geometric coordinate transformation.

Figure 8:
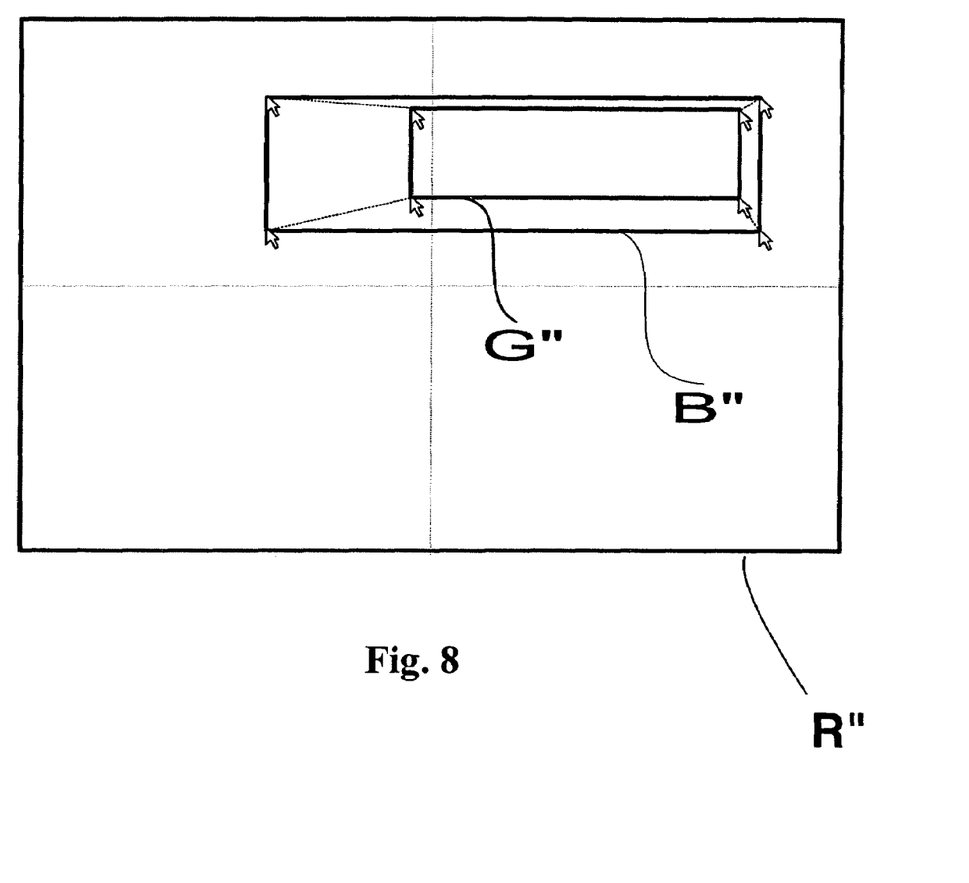
FIG. 8 is a diagrammatic view depicting a technique according to the invention for transposing a pointing device cursor position across a "lens shadow" defined between the magnifier frame and underlying (smaller) magnification region, to avoid cursor disappearance.

So long as the selected magnification level (ratio) is greater than 1:1, the magnification region will be smaller than the magnifier frame by an inversely proportional amount. This size difference results in a "lens shadow" region formed between the magnification region and the magnifier frame, within which screen content is overlaid by the magnifier but does not appear as part of the magnified image presented therein. An aspect of the invention avoids the potentially disorienting phenomena of the cursor disappearing as it enters into the lens shadow region, by transposing the position of the cursor directly from an edge of the magnifier frame to an edge of the magnification region. A coordinate transform may be done from the larger magnify lens to the smaller magnify region; the mouse cursor may be moved to its transformed location when it crosses either one of the boundaries (frame to lens or region to lens(frame)). When the cursor crosses any of the magnifier frame boundaries, a check is made to see where that crossing occurred. The cursor is then redrawn at a corresponding magnification region boundary, as if the cursor had directly crossed into the magnification region. This is illustrated for several different cursor position scenarios in FIG. 8. In FIG. 8, Rectangle R" represents the display screen. Rectangle B" represents the magnifier frame (lens). Rectangle G" represents the magnification region.

The present invention has been described in terms of preferred and exemplary embodiments thereof. Numerous other embodiments, modifications and variations within the scope and spirit of the appended claims will occur to persons of ordinary skill in the art from a review of this disclosure. In the claims, any use of the labels for algorithm variables appearing in the specification is for convenience and clarity and is not intended to have any limiting effect.

The invention claimed is:

1. A data processing device having a display screen and user input device, said device being configured to provide a display screen magnifier which is controllable by a user to magnify selected portions of a desktop including windows open on said screen, said magnifier providing a moveable magnifier frame within which a magnified image is presented, said image corresponding to screen content located within a magnification region underlying said magnifier frame, magnified to a set level of magnification, said magnification region being moveable within said magnifier frame in proportion to the movement of the magnifier frame on said display screen, wherein, when said magnifier frame reaches a first edge of said display screen such that a horizontal edge of said magnifier frame is coincident with a horizontal edge of said display screen, a horizontal edge of said magnification region is coincident with said horizontal edge of said magnifier frame, and, when said magnifier frame reaches a second edge of said display screen such that a vertical edge of said magnifier frame is coincident with a vertical edge of said display screen, a vertical edge of said magnification region is coincident with said vertical edge of said magnifier frame, wherein:

a cursor of a user input device is moveable across said screen display into and out of said magnification region, and wherein when the position of said cursor falls within said magnification region said cursor appears within the magnified image presented within the magnifier frame; and     the size of said magnification region in relation to the magnifier frame varies in inverse proportion to a magnification ratio of the magnifier, such that a lens shadow area is defined between the magnifier frame and the magnification region, and wherein when said cursor passes into the lens shadow area, the magnifier transposes the cursor position to a corresponding position at the edge of the magnification region.

2. A data processing device according to claim 1, wherein said magnifier frame comprises a window that is configured to remain on top of the desktop including open windows while the magnifier is activated, and which will pass events of a user input device to windows located beneath the magnifier frame.

3. A method of configuring a data processing device having a display screen and user input device, to provide a display screen magnifier which is controllable by a user to magnify selected portions of a desktop including windows open on said screen, said magnifier providing a moveable magnifier frame within which a magnified image is presented, said image corresponding to screen content located within a magnification region underlying said magnifier frame, magnified to a set level of magnification, said magnification region being moveable within said magnifier frame in proportion to the movement of the magnifier frame on said display screen, wherein, when said magnifier frame reaches a first edge of said display screen such that a horizontal edge of said magnifier frame is coincident with a horizontal edge of said display screen, a horizontal edge of said magnification region is coincident with said horizontal edge of said magnifier frame, and, when said magnifier frame reaches a second edge of said display screen such that a vertical edge of said magnifier frame is coincident with a vertical edge of said display screen, a vertical edge of said magnification region is coincident with said vertical edge of said magnifier frame, the method comprising:

allowing a cursor of a user input device to move across said screen display into and out of said magnification region, wherein when the position of said cursor falls within said magnification region said cursor appears within the magnified image presented within the magnifier frame; and     varying the size of said magnification region in relation to the magnifier frame in inverse proportion to a magnification ratio of the magnifier, such that a lens shadow area is defined between the magnifier frame and the magnification region, and wherein when said cursor passes into the lens shadow area, the magnifier transposes the cursor position to a corresponding position at the edge of the magnification region.

4. A method according to claim 3, wherein said magnifier frame comprises a window that is configured to remain on top of the desktop including open windows while the magnifier is activated, and which will pass events of a user input device to windows located beneath the magnifier frame.

5. A method according to claim 4, wherein, said display screen magnifier is configured by a windows style of an application programming interface of an operating system, and a second stage screen content compositing engine associated with said windows style.

6. A method according to claim 3, wherein said window of the magnifier is drawn to the screen after all windows beneath the magnifier are drawn.

* * * * *